(12) United States Patent
Okuno et al.

(10) Patent No.: US 8,377,567 B2
(45) Date of Patent: Feb. 19, 2013

(54) HIGHLY CORROSION-RESISTANT POROUS METAL MEMBER

(75) Inventors: Kazuki Okuno, Itami (JP); Masahiro Kato, Itami (JP); Tomoyuki Awazu, Itami (JP); Masatoshi Majima, Itami (JP); Hidetoshi Saito, Imizu (JP); Keiji Shiraishi, Imizu (JP); Hitoshi Tsuchida, Imizu (JP); Junichi Nishimura, Imizu (JP)

(73) Assignees: Sumitomo Electric Industries, Ltd., Osaka-shi, Osaka (JP); Sumitomo Electric Toyama Co., Ltd., Imizu-shi, Toyama (JP)

( * ) Notice: Subject to any disclaimer, the term of this patent is extended or adjusted under 35 U.S.C. 154(b) by 0 days.

(21) Appl. No.: 13/111,488

(22) Filed: May 19, 2011

(65) Prior Publication Data
US 2011/0287279 A1 Nov. 24, 2011

(30) Foreign Application Priority Data
May 20, 2010 (JP) ................................ 2010-116054

(51) Int. Cl.
*B32B 5/18* (2006.01)
*B32B 15/04* (2006.01)

(52) U.S. Cl. ........ 428/613; 428/680; 428/688; 428/689; 428/697; 428/699

(58) Field of Classification Search .................. 428/613, 428/680, 688, 689, 697, 699
See application file for complete search history.

(56) References Cited

FOREIGN PATENT DOCUMENTS

| JP | S61-238446 A | 10/1986 |
|---|---|---|
| JP | H06-068881 A | 3/1994 |
| JP | H06-248492 A | 9/1994 |
| JP | 08013120 * | 1/1996 |
| JP | H08-092669 A | 4/1996 |
| JP | H08-124578 A | 5/1996 |
| JP | 10-130878 | 5/1998 |
| JP | 11-154517 | 6/1999 |
| JP | 11-233151 | 8/1999 |
| JP | 2000-195522 | 7/2000 |
| JP | 2002-004094 A | 1/2002 |
| JP | 2005-78991 | 3/2005 |
| JP | 2006-32144 | 2/2006 |

OTHER PUBLICATIONS

JP-08013120, Ishihara, Patent Abstracts of Japan, 1996.*
Notification of Reasons for Rejection of the corresponding Japanese Patent Application No. 2010-116054, dated Jun. 27, 2012, and its partial English translation (5 pages).

* cited by examiner

*Primary Examiner* — Jennifer McNeil
*Assistant Examiner* — Lauren Colgan
(74) *Attorney, Agent, or Firm* — Drinker Biddle & Reath LLP

(57) ABSTRACT

A porous metal member composed of an alloy at least containing nickel and tungsten is provided. The alloy may contain 50 to 80 wt % of nickel and 20 to 50 wt % of tungsten and may further contain 10 wt % or less of phosphorus and/or 10 wt % or less of boron. Such a porous metal member can be produced by, for example, making a porous base such as a urethane foam be electrically conductive, forming an alloy film containing nickel and tungsten, then removing the porous base from the alloy film, and subsequently reducing the alloy.

4 Claims, No Drawings

HIGHLY CORROSION-RESISTANT POROUS METAL MEMBER

BACKGROUND OF THE INVENTION

1. Field of the Invention

The present invention relates to a porous metal member that is used for a collector for batteries such as lithium-ion batteries, capacitors, or fuel cells.

2. Description of the Background Art

In general, metal foils such as aluminum foils are used, in lithium-ion batteries, as collectors (supports) to which positive-electrode materials and negative-electrode materials are made to adhere. However, metal foils have a two-dimensional structure and hence are inferior in terms of carrying of active materials and packing density of active materials to porous members. Specifically, metal foils cannot hold active materials in a manner in which metal foils contain active materials. Accordingly, metal foils cannot suppress expansion or contraction of active materials and hence the amount of active materials held on metal foils is limited to make the resultant collectors practically function for a certain period. In addition, the distance between collectors and active materials is long and active materials relatively far away from collectors are less likely to be used. Thus, such batteries have a low capacity density. To address such a problem, metal foils are used in the form of a porous member such as a perforated metal member, a screen, or an expanded metal member. However, these metal foils substantially have two-dimensional structures and hence a considerable increase in the capacity density of batteries is not expected.

To provide batteries having a higher output, a higher capacity, a longer life, or the like, many collectors that are three-dimensional porous members such as foam or nonwoven fabric have been proposed (refer to Japanese Unexamined Patent Application Publication Nos. 11-233151, 2000-195522, 2005-078991, and 2006-032144).

For example, Japanese Unexamined Patent Application Publication No. 11-233151 discloses, as a positive-electrode collector, a three-dimensional network porous member whose surface is composed of aluminum, an aluminum alloy, or stainless steel.

Japanese Unexamined Patent Application Publication No. 2000-195522 discloses that an electrode-mixture member in which a porous polymer is uniformly distributed between active-material layers and on the surface of the active material is integrated with a collector that is a three-dimensional porous member composed of a metal such as aluminum, copper, zinc, or iron, a conductive polymer such as polypyrrole or polyaniline, or a mixture of the foregoing, to thereby form an electrode.

Japanese Unexamined Patent Application Publication No. 2005-078991 discloses an electrode in which an electrode active-material thin layer is formed on a porous collector composed of an elemental metal of aluminum, tantalum, niobium, titanium, hafnium, zirconium, zinc, tungsten, bismuth, or antimony, an alloy of the foregoing, or a stainless-steel alloy. Japanese Unexamined Patent Application Publication No. 2006-032144 discloses that an aluminum foam, a nickel foam, or the like is used as a positive-electrode collector.

In general, to provide secondary batteries having a higher output and a higher capacity, there has been a demand for collectors that are three-dimensional structures, which are more porous than two-dimensional structures. In addition, since positive-electrode collectors are susceptible to oxidation by electrolytes under a high charging-discharging voltage, positive-electrode collectors having sufficiently high oxidation resistance and electrolyte resistance have also been demanded.

Three-dimensional metal structures having a high porosity (hereafter, referred to as "porous metal members") are generally produced by making a porous non-conductive resin member be electrically conductive, electrolytically plating this porous resin member with a predetermined amount of a metal, and, if necessary, incinerating the inner resin portion of the resultant member. For example, Japanese Unexamined Patent Application Publication No. 11-154517 states that a porous metal member is produced by plating the structural surface of a polyurethane foam with nickel and then removing the polyurethane foam.

However, positive-electrode collectors that have sufficiently high oxidation resistance and electrolyte resistance, have a high porosity, and are suitable for industrial production, are not provided for lithium nonaqueous-electrolyte secondary batteries for the following reasons.

In general, to produce a collector having a high porosity such as a porous nickel member serving as a typical example, the surface of a porous organic-resin member is plated and, if necessary, the organic-resin portion is removed by incineration. However, porous nickel members are susceptible to oxidation in lithium nonaqueous-electrolyte secondary batteries and dissolved in electrolytic solutions. Accordingly, such batteries are not able to be sufficiently charged after charging and discharging are repeated for a long period of time.

To perform plating with aluminum, which is a main material of positive-electrode collectors, molten aluminum salt at a very high temperature is used. Accordingly, surfaces of organic-resin members cannot be plated with aluminum. Thus, porous aluminum collectors are not provided.

Stainless steel is also widely used as a material of positive-electrode collectors. However, for the same reason as for aluminum, it is difficult to provide collectors having a high porosity by plating surfaces of organic-resin members with stainless steel.

There is a method for producing a porous stainless-steel member by applying stainless-steel powder to a porous organic-resin member and sintering the applied powder.

However, stainless-steel powder is very expensive. In addition, a porous organic-resin member to which the powder is applied is removed by incineration and the resultant porous stainless-steel member has a poor strength and is not practically usable, which is problematic.

Accordingly, there is a demand for a collector that has sufficiently high oxidation resistance and electrolyte resistance, has a high porosity, and is suitable for industrial production; and a positive electrode including such a collector.

SUMMARY OF THE INVENTION

An object of the present invention is to provide a porous metal member that is excellent in terms of electrolytic resistance, corrosion resistance, and heat resistance and that is suitable for a collector for batteries such as lithium-ion batteries, capacitors, or fuel cells.

(1) According to an aspect of the present invention, a porous metal member is composed of an alloy at least containing nickel and tungsten.

(2) In the porous metal member according to (1), the alloy may contain 50 to 80 wt % of nickel and 20 to 50 wt % of tungsten.

(3) In the porous metal member according to (2), the alloy may further contain 10 wt % or less of phosphorus and/or 10 wt % or less of boron as a compound.

The present invention can provide a porous metal member that is excellent in terms of electrolytic resistance, corrosion resistance, and heat resistance and that is suitable for a collector for batteries such as lithium-ion batteries, capacitors, or fuel cells.

DETAILED DESCRIPTION OF THE INVENTION

A porous metal member according to an embodiment of the present invention can be produced by, for example, making the surface of a porous resin base be electrically conductive by the formation of an electrically conductive film (hereafter, referred to as "conductive coating layer") on the porous base; forming an electrolytic plating layer on the surface of the porous resin base by electrolytically plating the conductive coating layer; and then removing the porous resin base from the electrolytic plating layer.

Porous Base

A porous base used in an embodiment of the present invention will suffice as long as the base is porous and hence may be an existing base and/or a commercially available product. Specifically, a resin foam, nonwoven fabric, felt, woven fabric, or the like may be used and, if necessary, these materials may be used in combination. The material of the porous base is not particularly limited; however, a material that can be plated with metal and then can be removed from the resultant metal member by incineration is preferred. When a porous resin member, particularly in the form of a sheet, is highly stiff, the member tends to break. Accordingly, the material of the porous base is preferably flexible. In an embodiment of the present invention, a resin foam is preferably used as a porous base. Examples of a resin foam include a urethane foam, a styrene foam, and a melamine-resin foam. Of these, a urethane foam is preferred in view of a high porosity.

The porosity of the porous base is not limited and is generally about 60% to 97% and preferably about 80% to 96%.

The thickness of the porous base is not limited and is appropriately selected in accordance with the application or the like; however, the thickness is generally about 300 to 5,000 µm and preferably about 400 to 2,000 µm.

Hereinafter, an embodiment of the present invention will be described with reference to a case where a resin foam is used as a porous base.

Treatment of Making Resin Foam be Electrically Conductive

A treatment of making resin foam be electrically conductive is not limited as long as a layer having electrical conductivity can be formed on the surface of a resin foam. Examples of a material for forming such an electrical conductive layer (conductive coating layer) include metals such as nickel, titanium, and stainless steel; and graphite.

Specifically, for example, when a nickel layer is formed in the treatment, electroless plating, sputtering, or the like is preferably performed. Alternatively, when a layer is formed of a metal such as titanium or stainless steel, graphite, or the like in the treatment, a mixture prepared by mixing fine powder of such a material with a binder is preferably applied to the surface of a resin foam.

The electroless plating with nickel can be performed by, for example, immersing a resin foam into an existing electroless-nickel-plating bath such as an aqueous solution of nickel sulfate containing sodium hypophosphite serving as a reducing agent. If necessary, prior to the immersion into the plating bath, a resin foam may be immersed into, for example, an activation solution containing a small amount of palladium ions (a cleaning solution manufactured by JAPAN KANIGEN CO., LTD.).

The sputtering treatment with nickel can be performed by, for example, holding a resin foam with a substrate holder, then introducing an inert gas into the sputtering apparatus and applying a direct voltage between the holder and a target (nickel) to thereby make inert-gas ions impinge onto the nickel target and deposit the sputtered nickel particles on the surface of the resin foam.

The weight (adhesion amount) (weight per area) of the conductive coating layer is preferably adjusted such that the final porous member has a metal composition containing 50 to 80 wt % of nickel and 20 to 50 wt % of tungsten.

When the conductive coating layer is formed of nickel, it will suffice that the conductive coating layer is continuously formed on the surface of a resin foam and the weight of the conductive coating layer is not limited; however, the weight (weight per area) is generally about 5 to 15 $g/m^2$ and preferably about 7 to 10 $g/m^2$.

Hereinafter, steps performed after the formation of the conductive coating layer will be specifically described.

Electrolytic Nickel-Tungsten Plating Treatment

An electrolytic nickel-tungsten plating treatment may be performed in a standard manner (for example, a method disclosed in Japanese Unexamined Patent Application Publication No. 10-130878). A plating bath used for the electrolytic nickel-tungsten plating treatment may be an existing plating bath and/or a commercially available product. For example, such a plating solution is prepared by mixing 60 g of sodium tungstate, 20 g of nickel sulfate, 60 g of citric acid, and 40 g of ammonia relative to 1,000 g of water.

An electrolytic nickel-tungsten plating layer (hereafter, nickel-tungsten layer) can be formed on the conductive coating layer, which is formed on the resin foam by the electroless plating or sputtering, by immersing the resin foam into a plating bath and passing direct current or pulse current between a cathode to which the resin foam is connected and an anode to which a nickel counter electrode plate and a tungsten counter electrode plate are connected. In this case, to suppress decomposition of additives, an insoluble anode is preferably used that serves as the third anode and is disposed in an anode case including an ion exchange membrane. This insoluble anode may be a titanium member plated with platinum. The anode case is filled with about 10 wt % of sulfuric acid.

The weight (weight per area) of the nickel-tungsten layer is preferably adjusted such that the final porous member has a metal composition containing 50 to 80 wt % of nickel and 20 to 50 wt % of tungsten.

Circulation of Plating Solution During Plating

In general, when a resin foam is plated, it is difficult to uniformly plate the interior of the resin foam. To suppress generation of unplated interior portions and to reduce the difference in plating amount between the interior and the exterior of a resin foam, a plating solution is preferably circulated. A plating solution can be circulated by, for example, using a pump or a fan that is placed in a plating tank. In this case, when a plating solution is sprayed onto a base or a base is placed next to a suction port, the plating solution tends to flow through the interior of the base, which enables more uniform plating of the interior of the base.

Resin-Foam Removal Treatment

The process of removing a resin-foam portion is not limited; however, a resin-foam portion is preferably removed by incineration. Specifically, for example, a resin-foam portion may be heated at a temperature of about 600° C. or more in an oxidizing atmosphere such as the air. The resultant porous member is heated in a reducing atmosphere so that the metal is reduced. Thus, a porous metal member is provided.

Heat Treatment

An as-formed nickel-tungsten layer may have defects such as pin holes and exposed nickel portions having low corrosion resistance. Accordingly, such a film is preferably heated so that the tungsten component is diffused therein. In this case, when the heating temperature is too low, the diffusion takes a long time. When the heating temperature is too high, the film is softened and the porous structure may be damaged due to the self weight. Thus, the heat treatment is preferably performed in a temperature range of 300° C. to 1,000° C. The atmosphere in the heat treatment is preferably a non-oxidizing atmosphere of nitrogen, argon, or the like; or a reducing atmosphere of hydrogen or the like.

Porous Metal Member

As to metal plating weight, the total metal plating weight (weight per area) of the conductive coating layer and nickel-tungsten layer is preferably 200 g/m$^2$ or more and 500 g/m$^2$ or less. When the total metal plating weight is less than the lower limit, the collector may have a low strength.

When the total metal plating weight is more than the upper limit, the amount of a polarizable material added is low and the production cost is high.

As to pore size, when a porous metal member is used as a catalytic layer of a fuel cell, the porous metal member preferably has an average pore size (average pore diameter) of 2 to 3 µm. When a porous metal member is used as a collector, the porous metal member preferably has an average pore size (average pore diameter) of 80 to 500 µm.

The porous metal member according to the present invention is composed of an alloy at least containing nickel and tungsten, and preferably may contain 50 to 80 wt % of nickel and 20 to 50 wt % of tungsten.

The porous metal member according to the present invention preferably may further contain 10 wt % or less of phosphorus and/or 10 wt % or less of boron as a compound.

In order to contain phosphorus in the member as a compound, the plating solution described in "Electrolytic nickel-tungsten plating treatment" as above may further contain sodium hypophosphite (for example, 30 g/L of sodium hypophosphite). The other conditions such as current for the plating may be the same as the embodiment in which phosphorus is not contained.

In order to contain boron in the member as a compound, as a treatment of making resin foam be electrically conductive, an electroless nickel-boron plating treatment may be carried out. The electroless nickel-boron plating treatment is conventional technique and may be carried out by using commercially available chemicals.

EXAMPLES

Example 1

A polyurethane (urethane foam) sheet having a thickness of 1.5 mm was used as a porous resin sheet. The surfaces of this sheet were treated by immersing the sheet in a mixture of 400 g/L of chromium trioxide and 400 g/L of sulfuric acid at 60° C. for a minute. As a result of such a surface treatment, the sheet is made to have an anchoring effect on a conductive coating layer to be formed thereon and a high adhesion between the sheet and the conductive coating layer is achieved.

A carbon coating solution was then prepared by dispersing 20 g of a carbon powder having a particle size of 0.01 to 20 µm in 80 g of a 10% aqueous solution of an acrylic styrene synthetic resin.

The polyurethane sheet was subsequently made to be electrically conductive by being continuously immersed in the coating solution, squeezed with rollers, and then dried.

The polyurethane sheet was then subjected to an electrolytic nickel-tungsten plating treatment. The urethane portion of the resultant member was removed by a heat treatment.

Thus, a porous metal member having a composition (65 wt % of nickel and 34 wt % of tungsten), a thickness of 1.0 mm, and a metal plating weight (weight per area) of 400 g/m$^2$ was provided.

The plating solution used was prepared by mixing 60 g of sodium tungstate, 20 g of nickel sulfate, 60 g of citric acid, and 40 g of ammonia relative to 1,000 g of water.

Comparative Example 1

A polyurethane sheet having been made to be electrically conductive by the same procedures as in Example 1 was plated with nickel with a standard Watts bath. The Watts bath was prepared by mixing 300 g of nickel sulfate, 45 g of nickel chloride, and 35 g of boric acid relative to 1,000 g of water. Then, the urethane portion of the resultant member was removed by a heat treatment. Thus, a porous nickel member having a thickness of 1.0 mm and a metal plating weight (weight per area) of 400 g/m$^2$ was provided.

Evaluation

Evaluation of Electrolytic Resistance

To determine whether the thus-obtained porous metal members can be used or not in lithium-ion batteries or capacitors, the porous metal members were examined in terms of electrolytic resistance by cyclic voltammetry. Each porous metal member was pressed with a roller press so as to have a thickness of 0.4 mm and cut into square pieces of 3 cm per side. Aluminum tabs were welded as leads to the pieces. The pieces were stacked with a micro-porous membrane separator therebetween to prepare an aluminum laminate cell. A reference electrode was pressed to the nickel tab. An electrolytic solution contained ethylene carbonate (Ec) and diethyl carbonate (DEC) with a Ec/DEC ratio of 1:1 and contained 1 mol/L LiPF$_6$.

The measurement potential was in a range of 0 to 5 V with reference to the lithium potential. When porous metal members are used for lithium-ion batteries or capacitors, it is necessary that an oxidation current does not flow at a potential of 4.3 V. The potential at which an oxidation current begins to flow was measured at a potential sweep rate of 5 mV/s. The results are described in Table I below.

Table I shows that an oxidation current began to flow in the porous nickel member of the comparative example 1 at a potential lower than 4 V, whereas no oxidation current flowed in the porous nickel-tungsten member according to an embodiment of the present invention even at a potential of 4.3 V. Thus, it has been demonstrated that the porous nickel-tungsten member according to an embodiment of the present invention can be used for lithium-ion batteries and capacitors.

TABLE I

| | Potential at which oxidation current begins to flow (V) |
|---|---|
| Example 1 | 4.7 |
| Comparative example 1 | 3.6 |

Evaluation of Corrosion Resistance

To examine the corrosion resistance of the porous metal members, the porous metal members were subjected to a salt-spray test under conditions according to JASO M609. Specifically, the porous metal members were sprayed with a salt solution for 2 hours in accordance with JIS Z2371, dried (at 60° C. and at a relative humidity of 30 or less) for 4 hours, and moistened (at 60° C. and at a relative humidity of 80 or more) for 2 hours. This process (8 h in total) was defined as a single cycle and six cycles (48 h) were performed. Changes in the appearance of the porous metal members in the test are summarized in Table II below.

Table II shows that discoloration and rust were observed in the porous nickel member of the comparative example 1 after the first cycle, and the later cycles were not performed, whereas no rust was observed in the porous nickel-tungsten member according to an embodiment of the present invention even after the sixth cycle though partial discoloration was observed.

TABLE II

| Number of cycles | Example 1 | Comparative example 1 |
| --- | --- | --- |
| 1 | No change | Discoloration and rust |
| 2 | No change | Not measured |
| 3 | No change | Not measured |
| 4 | No change | Not measured |
| 5 | No change | Not measured |
| 6 | Discoloration | Not measured |

Evaluation of Heat Resistance

The porous metal members were evaluated in terms of heat resistance by being heated in the air at 800° C. for 12 hours and examined for change of color and strength in the members before and after the heating. The results are described in Table III below.

Table III shows that the porous metal member according to an embodiment of the present invention has excellent heat resistance, compared with the porous metal member in Comparative example 1.

TABLE III

|  | Example 1 | Comparative example 1 |
| --- | --- | --- |
| Change by heating | No change | Discoloration and strength decrease Oxidation |

INDUSTRIAL APPLICABILITY

A porous metal member according to an embodiment of the present invention is excellent in terms of electrolytic resistance, corrosion resistance, and heat resistance and hence is suitably used for a collector for batteries such as lithium ion batteries, capacitors, or fuel cells.

What is claimed is:

1. A porous metal member composed of an alloy at least containing nickel and tungsten, the alloy having between 50 wt % and 80 wt % nickel and between 20 wt % and 50 wt % tungsten, the porous metal member comprising:
   a conductive coating layer; and
   a nickel-tungsten layer,
   wherein a total metal plating weight of the conductive coating layer and the nickel-tungsten layer is between 200 g/m$^2$ and 500 g/m$^2$.

2. The porous metal member according to claim 1, wherein the alloy further includes at least one of 10 wt % or less of phosphorous and 10 wt % or less of boron as a compound.

3. The porous metal member according to claim 1, wherein an average pore size of the porous metal member is between 2 μm and 3 μm, or between 80 μm and 500 μm.

4. The porous metal member according to claim 1, wherein the porous metal member has a thickness of 1 mm.

* * * * *